Feb. 13, 1968     L. G. KILMER     3,368,642
GAS EXPLODER SEISMIC WAVE GENERATOR
Filed April 20, 1966
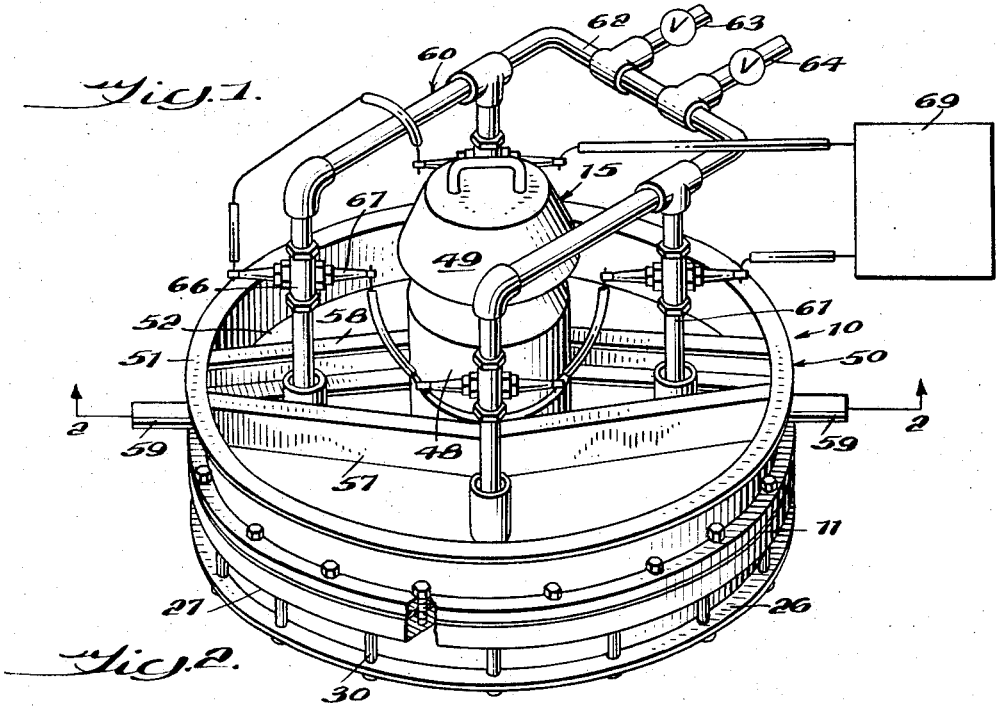
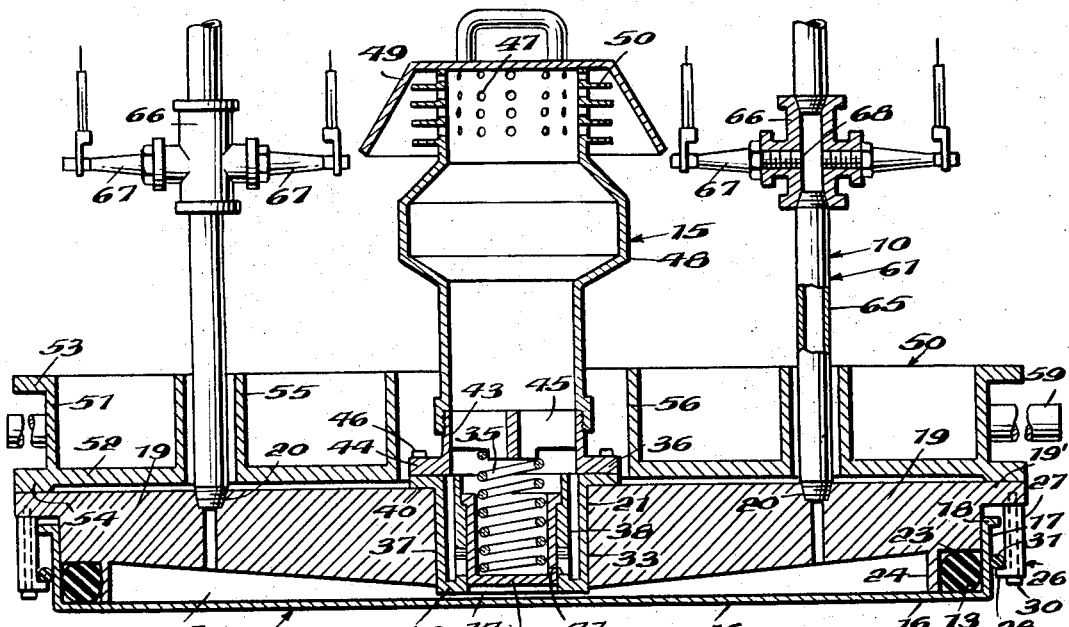
INVENTOR.
LAUREN G. KILMER
BY
McLean, Morton Boustead
ATTORNEYS United States Patent Office 3,368,642
Patented Feb. 13, 1968

3,368,642
GAS EXPLODER SEISMIC WAVE GENERATOR
Lauren G. Kilmer, Tulsa, Okla., assignor, by mesne assignments, to Sinclair Research, Inc., New York, N.Y., a corporation of Delaware
Filed Apr. 20, 1966, Ser. No. 543,966
6 Claims. (Cl. 181—.5)

ABSTRACT OF THE DISCLOSURE

A gas explosion seismic generator in which the explosion chamber is an annular conical space formed by a bottom plate and a movable top plate with the space adjacent a center exhaust valve having a minimum depth and gradually increasing in depth in an outward direction.

This invention reates to geophysical prospecting and in particular provides a device for imparting a compressive impulse at the earth's surface of improved signal input into the ground.

The past decade has seen the introduction and widespread use of sources of seismic signals for geophysical prospecting purposes in which the seismic signal is created by the generation of a compressive impulse at the surface of the earth, as distinguished from the older and more conventional explosion of a charge of dynamite or the like located at a depth below the surface of the earth. Initially such new sources were weight droppers for the most part, but subsequently hydraulic hammers and more recently gas exploders have also been found effective sources of seismic signals which in many instances can be utilized where the conventional buried explosive charge cannot. In many instances, gas exploders can be utilized to develop seismic records with indications of subsurface structure which could not be developed utilizing previously available seismic sources.

As described in co-pending Kilmer applications Ser. No. 187,111, filed Apr. 12, 1962, now Patent No. 3,235,027, and Ser. No. 314,230, filed Oct. 7, 1963, now Patent No. 3,314,497, a gas explosion confined in an expansible chamber acting at the earth-air interface against a large mass positioned above such gas explosion can be utilized to impart a compressive impulse to the surface of the earth beneath the gas explosion thereby initiating a seismic wave. If the explosion is confined in a device having a rigid top (carrying the weight of the large mass) and rigid bottom with vertically extensible sidewalls, the seismic wave generated is useful for seismic prospecting by refraction and reflection techniques, since the impulse imparted to the surface of the earth has a high energy content and can be made of extremely short duration. Since the useful energy imparted to the earth in such a device occurs at the moment of the explosion before there is any significant upward movement of the top of the device occurring as a result of the explosion, it is feasible to vent the chamber in which the explosion is confined the moment vertical extension of the sidewalls occurs. It is apparent, however, that some vertical movement of the sidewall must be permissible in order that the energy of the explosion can be transmitted into the earth. Although it is unnecessary to construct a device of this type, which for convenience will be called a gas exploder, to accommodate large vertical extensions of the sidewall, it is essential, however, that the sides of the gas exploder remain sealed, as the top extends upwardly, in order to prevent escape of exploding gases through the sides which might result in the generation of an air wave and thereby interfere with the detection of the desired seismic wave.

In the devices of the co-pending Kilmer applications, the rigid bottom, or transmission plate of the explosion chamber is a shallow cup having a relatively thin bottom plate which contacts the ground to seal the explosion chamber and to transmit to the ground the compressional wave. This configuration provides a uniform depth cavity above the transmission plate bottom into which gases are placed for explosion. It has been found, however, that since the bottom plate is flat and relatively weak, it is deformed into a sperical shape under the impulse of every explosion with a radius of sphericity which is dependent upon the size of the explosion and resilience of the ground upon which the bottom plate rests. The effect of this sphericity is to cause the compressional waves generated by the device to leave the bottom plate in a sperical form diverging from the center of the sphere or focus which is somewhere in space above the chamber. By diverging, the waves are spread over larger areas than necessary, and hence leave smaller amounts of energy to contact any particular reflecting horizon from which it is desired to reflect energy to be recorded at the surface of the ground. Since, however, these various new sources generally create a seismic signal with substantially less energy than is obtained, for example with a buried charge of dynamite, they are highly desirable and techniques have been developed for obtaining usable records when using them. Such techniques, for example, have involved the creation of a succession of compressive impulses in which at a given seismic detector one record is obtained for each impulse. The records thus obtained then are summed algebraically, integrated, multiplied, or otherwise combined, to extract the desired signal from its background noise. It is the object of this invention to provide a new means of improving the seismic signal, i.e., to improve the signal input into the earth from devices of the type described in the co-pending Kilmer applications regardless of the shot size or frequency spectrum.

According to this invention the explosion chamber above the transmission plate bottom is formed as an annular conical space, with the space adjacent to the center exhaust valve having a minimum depth and gradually increasing in depth to the outer flange. The transmission plate will remain a relatively thin rigid plate. With such a chamber shape, since the greater bulk of gas is confined to an area around the edge of the transmission plate, the plate will be moved more positively near the edge than near the center by the impulse of the explosion. This will cause the plate to be bowed less in the center and to have a longer spherical radius. The concentration of energy in this manner can cause such large movements of the edge of the plate that the bottom will remain flat or even reversed in sphericity such that the spherical focal point will be below the exploder. Under these conditions, the compressional wave developed by the explosions will have a plane or even a focusing front which can result in more energy reaching the reflecting horizons in a position to reflect back to the surface of the ground. It is recognized that even a plane wave will diverge to some extent as it leaves the generating surface, however, if that surface is concave the divergence will be reduced.

Another feature of the construction of this invention is to obviate the disadvantages resulting from the fact that all of the exhaust gases are not exhausted from the chamber during any explosion cycle in the conventional gas exploder. Those exhaust gases which remain are pushed to the outside extremities of the present uniform space when new gases are introduced, e.g., in four places close to the center of the chamber as shown in the Kilmer copending applications, and the concentration of inert gases mixed slightly with new gas in the peripheral area results in a weakened explosion in that area. In the construction of the co-pending Kilmer applications, for example, the center of the bottom plate receives an acceleration of approximately 8000 G's whereas the edges receive an acceleration of approximately 4000 G's at normal fill pressures. In the construction in accordance with this invention there is a larger volume in the chamber at the rim of the bottom plate into which the inert gases can be pushed and the ratio of inert to new gas will be less so that the explosion strength will be large at the rim even if the volume of gases is the same as heretofore in the area involved.

In general, the gas exploder of this invention comprises a relatively thin bottom plate, e.g., a steel plate of about 3/16 to about 5/8 inch thick and a relatively heavy top plate connected therewith by a vertically expansible sidewall. The heavy top plate is machined to form an annular conical chamber with the bottom plate and sidewall. The chamber at the inner rim can have a height of from zero to about 3/4 inch and preferably is connected to a central exhaust opening by an annular opening of about 1/4 to 1/2 inch in height. The angle at which the upper surface of the chamber slopes is generally from about 4° to 8°, preferably about 6° or 7°, which when related to the diameter of the chamber, typically 4 to 7 feet, gives a chamber height at the outer rim of about 1½ to about 3 inches. The weight of the heavy top plate can vary widely but in general is in excess of several thousand pounds.

For a more complete understanding of the practical application of my invention, reference is made to the appended drawings in which:

FIGURE 1 is an isometric view of a gas exploder constructed in accordance with my present invention;

FIGURE 2 is a vertical section taken at line 2—2 in FIGURE 1; and

FIGURE 3 is a sectional view of a modified retaining hoop for use with the invention.

Referring now to FIGURES 1 and 2 the reference number 10 designates a gas exploder constructed in accordance with this present invention. Gas exploder 10 basically includes a top 11, a bottom 12, a sealing ring 13, a valve 14 and an exhaust stack 15. Bottom 12 includes a relatively thin, circular steel plate 16 which at its rim is provided with an integral, upstanding cylindrical flange 17 which at its upper end carries an integral, outwardly-extending, short, annular flange 18. Top 11 includes an annular, thick-steel plate 19 having an outside diameter slightly larger than the outside diameter of flange 18 and which is further provided with four small, tapped, vertical openings 20 disposed at 90° intervals about plate 19 approximately midway between its central opening 21 and its rim.

The bottom surface 22 of plate 19 together with the bottom 12, i.e., plate 16 and flange 17, forms chamber A which due to the slope of surface 22 generally is an annular, conical space with the space adjacent to the open center 21 as a minimum depth and gradually increasing in depth to flange 17. The surface 22 slopes outwardly and upwardly to a flange 24 which is provided adjacent the outer edge of plate 19 and which forms an annular seat 23 sized to receive the sealing O-ring 13. The flange 24 of plate 19 is approximately of the same height as flange 17 on bottom plate 16 and the seat 23 has an outside diameter slightly less than that of flange 17 such that top plate 19 can be positioned coaxially over bottom plate 16 inside flange 17 and spaced slightly inward of flange 17.

Sealing ring 13, which is made of chloroprene rubber, is positioned resting on the top of bottom plate 16 just inside flange 17 such that plate 19 rests on it. Preferably the thickness of ring 13 is sufficient that the bottom of plate 19 at the center, and of flange 24, slightly clears the top of bottom plate 16 and the sides of ring 13 are just tangent to the flange 24 and the inner side of flange 17.

Bottom 11 and top 12 are retained together by means of a hoop 26 positioned encircling flanges 17 and 18. Hoop 26 has an L-shaped cross section and consists of a vertical, cylindrical portion 27 having inwardly-extending, annular flange 29 at its lower end. The inward flange 29 can be provided with drain holes 28 (see FIGURE 3), when desired. Such drain holes 28 are particularly desired when operating in ice, snow, mud, etc., to provide for proper clearance between flanges 18 and 29. The hoop 26 is secured to the underside of the rim of plate 19 by means of a series of cap bolts 30 which extend upwardly through apertures disposed at intervals about the cylindrical portion 27 of hoop 26 which bolts have their shank ends threadedly received in correspondingly positioned tapped openings in the underside of the rim of plate 19 to hold hoop 26 firmly against the underside of plate 19.

The inside diameter of the cylindrical portion of hoop 26 is sized just to clear flange 18 on bottom 12 such that the inner annular flange 29 at the lower end of hoop 26 is spaced below and underlies flange 18 to receive an O-ring 31 (or strip) of hard chloroprene rubber between hoop 26 and flange 17. Rubber ring 31 has a diameter generally filling the space between lower inner flange 29 on hoop 26 and flange 18. Ring 31 can be retained in a U-shaped element 32 (see FIGURE 3) when desired, especially when drain holes 28 are used to provide for proper cushioning by the ring 31 as well as draining.

Valve 14 includes a valve body 33, a piston (valve element) 34, a helical spring 35 and a spring retainer cage 36. Generally valve body 33 includes a pair of coaxial cylindrical walls 37 and 38, which are spaced from each other, are closed together at their lower ends by means of an interconnecting annular end wall 39 and are open at their upper ends. The outer sidewall 37 at its upper end is provided with an outwardly extending annular flange 40 and itself has a diameter just less than that of opening 21 such that valve body 33 can be positioned in opening 21 with flange 40 overlying the top of plate 19. Inner wall 38 has a machined inside surface which is counter-sunk at its upper end and which is provided with a series of apertures 41 adjacent its lower end providing communication between the annular space between walls 37 and 38 and the central opening of valve body 33 lying inside wall 38.

Piston 34 is a machined casting sized to fit snugly but slidingly within cylindrical wall 38 and has a flange 42 at its upper end received in the counter bore in the upper end of the interior of wall 38 to limit downward movement of piston 34 at a position in which the lower, closed end of piston 34 is flush with the inner edge of surface 22 on the underside of plate 19 when piston 34 is dropped into the central opening of valve body 33 from its upper ends.

Spring cage 36 is a short steel cylinder 43 which is threaded at its upper end and which has an outwardly projecting, annular flange 44 at its lower end and a pair of intersecting steel cross-plates in its upper interior portion forming a spider 45. The cylindrical portion 43 of spring cage 36 has the same inside diameter as sidewall 37 of valve body 33 and is positioned above valve body 33 with annular flange 44 on spring cage 36 overlying flange 40. Spring cage 36 is retained in such position by a series of cap bolts 46 received in apertures in flanges 40 and 44 which register with correspondingly disposed tapped bores about opening 21 in plate 19 such that helical spring 35 is retained snugly under compression between the underside of spider 45 and the upperside of the closed bottom of piston 34. The spacing of the flights of spring 35 in this position and the length of piston 34 in relation to the location of spider 45 is such that when piston 34 is displaced upwardly to the maximum compression of spring 35, apertures 41 in sidewall 38 are completely exposed to communicate the space confined between bottom 12 and top 11 with the annular space between walls 37 and 38 of valve body 33 and hence with the exterior of exploder 10 through spring cage 36. Muffler 15, which is of any conventional construction providing low-pass characteristics desirably having an upper cut-off frequency on the order of five cycles per second, is threadedly received at its open, lower end on the upper end of cylinder 43 of spring cage 36 and is provided with lateral openings 47 about its upper, closed end to permit venting of gases passing upwardly through valve 14 into muffler 15. Interiorly muffler 15 is hollow, in the illustrated case, and is centrally enlarged as indicated by the reference numeral 48. A frusto-conical deflector skirt 49 is mounted at the upper end of muffler 15 above openings 47 and extends downwardly and outwardly to below the level of openings 47. Optionally openings 47 can be disposed in several rows about the top of muffler 15 underlying deflector skirt 49, and the upper end of muffler 15 can be further provided with external annular baffles 50, if desired, positioned within deflector skirt 49 and spaced inwardly therefrom, each such baffle 50 being attached to muffler 15 between an adjacent pair of rows of openings 47.

It will be noted gas exploder 10 is further equipped with a shallow cylindrical tank 50 including, as integral parts, a cylindrical sidewall 51, an annular bottom plate 52, outwardly extending, annular flanges 53 and 54 at the upper and lower ends of sidewall 51 respectively, and four upstanding sleeves 55 having their lower ends disposed in openings in plate 52 registering with openings 20 but having wider diameters than openings 20. In addition the central aperture of plate 52, which is wider than flanges 40 and 44 on valve body 33 and spring cage 36, is also provided with an integral, upstanding sleeve 56 the lower end of which is disposed in such central aperture. Tank 50 is further provided with a pair of slightly bowed braces 57 and 58 which are in juxtaposition with their adjacent end pairs close and welded to the inside of sidewall 51 and with their centers bowed away from each other with sleeve 56 between them.

Exteriorly tank 50 is provided at diametrically opposite positions in its sidewall 51 with a pair of outwardly extending stub shafts 59 which are secured to sidewall 51, each adjacent one pair of adjacent ends of braces 57 and 58. Stub shafts 59 can be used for carrying gas exploder 10 in a fork-type device. If desired, tank 50 can retain a lead casting within sidewall 51 for extra weight. In such case sleeves 55 and sleeve 56 serve to provide access to openings 20 and to valve 14.

Gas exploder 10 further requires a gas charging and ignition system generally designated by the reference number 60. Charging and ignition system 60 basically includes four upstanding conduits 61 interconnected at their upper ends through a header 62 to separate valved connections 63 and 64 leading to storage cylinders respectively for propylene, or other suitable combustible gas, and for oxygen.

Each upstanding conduit 61 includes a pipe section 65 threadedly received at its lower end in a tapper aperture 20 in plate 19 and, threadedly received on the upper end of such pipe section 61, a four-way fitting 66. Header 62 generally includes suitable nipples, elbows and tees as well as pipe sections to provide a U-shaped connection communicating the upper openings of four-way fittings 66 with valved conduits 63 and 64 which are preferably connected to the bottom of the U.

Eight spark plugs 67 having their ground electrodes removed are connected, two to each four-way fitting 66, in the lateral openings of fittings 66 such that, as shown most clearly in FIGURE 2, the insulated electrodes 68 of each thusly associated pair of plugs 67 face each other in such fitting 66. Exteriorly eight spark plugs 67, thus mounted, are electrically connected in series across a suitable electrical supply 69 which is capable of impressing a high voltage, typically on the order of 70,000 volts, across serially interconnected spark plugs 67 at any desired instant in time.

In operation gas exploder 10 is located at a suitable location with bottom 12 resting on the ground at a spot clear of large stones and other undesirable structure. Typically spring 35 is under sufficient compression such that operation of piston 34 does not occur until a pressure within exploder 10 on the order of 30 p.s.i.g. has been reached. Valved conduits 63 and 64 are then opened to admit propylene and oxygen until a pressure in exploder 10 on the order of 2 to 5 p.s.i.g. has been achieved. (It will be apparent that a stoichiometric mixture of oxygen and propylene is sought and that this is achieved quite simply by introducing the gases such that the partial pressures of each are in proportion to the molar ratio of a stoichiometric mixture, i.e., $4.5:1::O_2:C_3H_6$.)

With valved conduits 63 and 64 closed, exploder 10 is properly charged and an explosion can be initiated simply by actuating high voltage source 69 at the desired point in time, whereupon high potential is placed across the serial connection of the eight spark plugs 67. It will be apparent that in the event of any fouling of spark plugs 67 at least two active gaps from an electrode 68 to ground or another electrode 68 are nevertheless provided such that combustion of the mixture of gases within exploder 10 is initiated with a resultant explosion occurring substantially simultaneously with energization of plugs 67.

When exploder 10 is charged the cross-section of sealing ring 13 is of substantially circular shape and the surfaces of flange 17 and plate 16 and surface 22 of plate 19 are tangent to the exterior of ring 13. Upon explosion of the gases in exploder 10, the initial force of the explosion is directed against bottom 12 due to the large mass of the top 11 to create the seismic wave of interest. The bottom 12 may be moved downward by this initial force a short distance which depends upon the compressibility of the ground, etc., upon which the exploder 10 rests. As the gases are exploded, however, subsequent to this initial force the continued expansion of the exploding gasses drives the mass of top 11 and its associated equipment upwardly relative to bottom 12 tending to compress resilient ring 31, which can so yield, although in a limited manner. At such time the pressure of the exploding gases forces sealing rings 13 tightly against the joint formed between the flange 17 and plate 19, generally deforming ring 13 against such joint and at the same time lifting ring 13 with the rising structure supported on and by plate 19. At the same time as relative movement of the bottom 12 and top 11 occurs, however, piston 34 is lifted at even faster rate to vent the interior of gas exploder 10 through valve 14 and muffler 15. This vent action is so rapid that normally the pressure is relieved and top 11 again collapes on bottom 12 within a fraction of a second. Since the greater bulk of gas in the chamber A is confined to an area around the edge of the transmission plate, the plate will be moved more positively near the edge of the transmission plate than near the center by the force of the explosion. This concentration of energy will cause such large movements of the edge of the plate that the bottom will remain flat or reversed such that the spherical focal point will be below the exploder. Under these conditions, the compressional wave will have a plane, or a focusing front, which results in a large amount of the energy produced reaching the reflecting horizons in a position to reflect back to phones. It is recognized that even a plane wave will diverge to some extent as it leaves the generating surface, but when that surface is concave, the divergence is reduced. Additionally, with the configuration of this invention, although all exhaust gases are not removed during any explosion cycle, those gases which remain are pushed to the outside extremities of the present uniform space when new gases are introduced at the four inlet conduits near to the center of the space and the lower concentration of the inert exhaust gases mixed with new gas in the peripheral area is compensated by the larger volume into which to push the inert gases.

I claim:
1. A device for initiating a seismic wave at the surface of the earth including means defining a chamber having a rigid, substantially flat, solid bottom adapted to be coupled to the ground and a rigid top, a joint defined between said top and bottom at their sides having clearances therebetween, means resiliently fastening said top to said bottom to permit limited vertical movement of said top relative to said bottom, a resilient sealing ring disposed between said top and bottom on the inner side of said joint positioned against the clearances thereof, gas charging means including fluid conduit means affixed to said chamber communicating with the interior of said chamber for charging the chamber with a combustible gas mixture; ignition means for igniting said mixture within said chamber, and exhaust means for said chamber including means defining an opening in said top centrally of said chamber, said top having a substantially greater mass than said bottom and having a bottom surface which forms the top of said chamber and which slopes downwardly from adjacent to the sealing ring to the means defining the opening in the top centrally of the chamber to thereby form a chamber which is an annular conical chamber with the space adjacent said opening having a minimum depth.

2. A device according to claim 1 in which the angle at which said surface slopes is from about 4° to 8°.

3. A device for initiating a seismic wave at the surface of the earth including means defining a chamber having a rigid, substantially flat, solid bottom adapted to be coupled to the ground and a rigid top, a joint defined between said top and bottom at their sides having clearances therebetween, means resiliently fastening said top to said bottom to permit limited vertical movement of said top relative to said bottom, a resilient sealing ring disposed between said top and bottom on the inner side of said joint positioned against the clearances thereof, said ring being positioned on said bottom and said top being positioned normally resting on said ring, gas charging means including fluid conduit means affixed to said chamber communicating with the interior of said chamber for charging the chamber with a combustible gas mixture; ignition means for igniting said mixture within said chamber, and exhaust means for said chamber including means defining an opening in said top centrally of said chamber, said top having a substantially greater mass than said bottom and having a sloping bottom surface whereby said chamber is an annular conical chamber with the space adjacent said opening having a minimum depth.

4. A device for initiating a seismic wave at the surface of the earth including means defining a chamber having a rigid, substantially flat, solid bottom adapted to be coupled to the ground and a rigid top, a joint defined between a pair of telescoping members one said member being part of said top and the other said member being part of said bottom, the one said member being positioned within the other said member and said chamber being defined interiorly of the one said member, means resiliently fastening said top to said bottom to permit limited vertical movement of said top relative to said bottom, a resilient sealing ring disposed between said top and bottom on the inner side of said joint positioned against the clearances thereof, gas charging means including fluid conduit means affixed to said chamber communicating with the interior of said chamber for charging the chamber with a combustible gas mixture; ignition means for igniting said mixture within said chamber, and exhaust means for said chamber including means defining an opening in said top centrally of said chamber, said top having a substantially greater mass than said bottom and having a sloping bottom surface whereby said chamber is an annular conical chamber with the space adjacent said opening having a minimum depth, the angle at which said surface slopes being from about 4° to 8°.

5. A device according to claim 4 in which the fluid conduit means includes a plurality of conduits positioned above said top and connected thereto to provide external communication to said chamber between the outer rim thereof and said opening, and said ignition means includes a pair of insulated electrodes positioned in each said conduit to define a spark gap therein, and means interconnecting said electrodes whereby said spark gaps are electrically connected in series.

6. A device for initiating a seismic wave at the surface of the earth including means defining a chamber having a rigid, substantially flat, solid bottom adapted to be coupled to the ground and a rigid top, a joint defined between a pair of telescoping members one said member being part of said top and the other said member being part of said bottom, the one said member being positioned within the other said member and said chamber being defined interiorly of the one said member, means resiliently fastening said top to said bottom to permit limited vertical movement of said top relative to said bottom, a resilient sealing ring disposed between said top and bottom on the inner side of said joint positioned against the clearances thereof, gas charging means including fluid conduit means affixed to said chamber communicating with the interior of said chamber for charging the chamber with a combustible gas mixture; ignition means for igniting said mixture within said chamber, and exhaust means for said chamber including means defining an opening in said top centrally of said chamber, said top having a substantially greater mass than said bottom and having a sloping bottom surface whereby said chamber is an annular conical chamber with the space adjacent said opening having a minimum depth, the height of said conical chamber at said opening being between about zero and three-fourths inch and at the outer edge thereof being between about one and one-half and three inches.

References Cited

UNITED STATES PATENTS

| | | | |
|---|---|---|---|
| 3,029,733 | 4/1962 | McElroy | 181—.5 |
| 3,260,327 | 7/1966 | McCollum | 181—.5 |

BENJAMIN A. BORCHELT, *Primary Examiner.*

G. H. GLANZMAN, *Assistant Examiner.*